United States Patent
Oomori et al.

(10) Patent No.: US 6,891,950 B1
(45) Date of Patent: May 10, 2005

(54) EXTENDED KEY GENERATOR, ENCRYPTION/DECRYPTION UNIT, EXTENDED KEY GENERATION METHOD, AND STORAGE MEDIUM

(75) Inventors: Motoji Oomori, Hirakata (JP); Kaoru Yokota, Ashiya (JP); Tsutomu Sekibe, Hirakata (JP); Makoto Tatebayashi, Takarazuka (JP); Fumihiko Sano, Fuchu (JP); Shinichi Kawamura, Kodaira (JP)

(73) Assignees: Kabushiki Kaisha Toshiba, Kawasaki (JP); Matsushita Electric Industrial Co., Ltd., Kadoma (JP)

( * ) Notice: Subject to any disclaimer, the term of this patent is extended or adjusted under 35 U.S.C. 154(b) by 846 days.

(21) Appl. No.: 09/652,157

(22) Filed: Aug. 31, 2000

(30) Foreign Application Priority Data

Aug. 31, 1999 (JP) ............................................ 11-244176

(51) Int. Cl.[7] .............................. H04L 9/00; H04K 1/00; H04K 1/04; H04K 1/06

(52) U.S. Cl. ............................. 380/44; 380/29; 380/37

(58) Field of Search .............................. 380/44, 29, 37; 235/380

(56) References Cited

U.S. PATENT DOCUMENTS

| | | | |
|---|---|---|---|
| 3,958,081 A | | 5/1976 | Ehrsam et al. |
| 4,255,811 A | * | 3/1981 | Adler ........................... 380/37 |
| 4,802,217 A | * | 1/1989 | Michener .................... 380/29 |
| 4,850,019 A | | 7/1989 | Shimizu et al. |
| 5,317,638 A | * | 5/1994 | Kao et al. .................... 380/29 |
| 5,442,705 A | * | 8/1995 | Miyano ........................ 380/29 |
| 5,511,123 A | | 4/1996 | Adams |
| 5,703,952 A | * | 12/1997 | Taylor .......................... 380/44 |
| 5,787,179 A | * | 7/1998 | Ogawa et al. ................ 380/46 |
| 5,949,884 A | | 9/1999 | Adams et al. |
| 6,246,768 B1 | * | 6/2001 | Kim ............................. 380/28 |
| 6,256,391 B1 | * | 7/2001 | Ishiguro et al. ............. 380/203 |
| 6,292,896 B1 | * | 9/2001 | Guski et al. ................. 713/169 |
| 6,570,989 B1 | * | 5/2003 | Ohmori et al. ............... 380/42 |
| 6,606,385 B1 | * | 8/2003 | Aikawa et al. ............... 380/28 |
| 6,683,956 B1 | * | 1/2004 | Aikawa et al. ............... 380/37 |

FOREIGN PATENT DOCUMENTS

| | | |
|---|---|---|
| EP | 0618 701 A2 | 10/1994 |
| EP | 1 052 611 A1 | 11/2000 |
| JP | 10-116029 A2 | 5/1998 |
| JP | 2000-261098 | 6/2002 |
| WO | WO99/14889 | 3/1999 |
| WO | WO99/38143 | 7/1999 |

OTHER PUBLICATIONS

Aiello, William et al. "Design of Practical and Provably Good Random Number Generators",.*
Han, Seung-Jo et al. "The Improved Data Encryption Standard (DES) Algorithm", 1996 IEEE, pp. 1310–1314.*
Keliher, Liam et al. "Provable Security of Substitution-Permutation Encryption Netowrks Against Linear Cryptanalysis", 2000 IEEE, pp. 37–42.*
Lim, Young Won. "Efficient 8–Cycle DES Implementation", 2000 IEEE, pp. 175–178.*

(Continued)

Primary Examiner—Gregory Morse
Assistant Examiner—Michael J. Simitoski
(74) Attorney, Agent, or Firm—Finnegan, Henderson, Farabow, Garrett & Dunner, L.L.P.

(57) ABSTRACT

There are disclosed an extended key generator, encryption/decryption unit, and storage medium, in which as each of key transform functions, a transform process is done by an S box (substitution table) on the basis of a first key obtained from the inputted key, and an adder computes a corresponding one of extended keys on the basis of a value obtained by shifting the transformed result of the S box to the left, and a second key obtained from the inputted key.

4 Claims, 15 Drawing Sheets

OTHER PUBLICATIONS

Seo, Young–Ho et al. "Hardware Implementation of 128–Bit Symmetric Cipher SEED", 2000 IEEE, pp. 183–186.*

Srinivasan, Ashok et al. "Random Number Generators for Parallel Applications", 1998.*

Menezes, Alfred J. et al., "Handbook of Applied Cryptography", pp. 223–283.

Schneier, Bruce, "Applied Cryptography—Protocols, Algorithms, and Source Code in C", Second Edition, pp. 265–369.

Akihiro Shimizu and Shoji Miyaguchi, "High–speed Data Encryption Algorithm FEAL", an anthology D of The Institute of Electronics, Information and Communication Engineers, Japan, The Institute of Electronics, Information and Communication Engineers, Jul. 20, 1987, vol. J70–D, No. 7, pp. 1413–1423.

Copy of Austrian Search Report mailed Aug. 23, 2002.

Schneier et al., "Applied Cryptography," $2^{nd}$ Edition, 1996, pp. 308–313.

Schneier et al., "Applied Cryptography," $2^{nd}$ Edition, 1996, pp. 13–16, 270–275, and 336–338.

* cited by examiner

| KEY TRANSFORM FUNCTION fki | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| VALUE OF CONSTANT REGISTER | 0 | 1 | 2 | 3 | 4 | 5 | 6 | 7 | 7 | 6 | 5 | 4 | 3 | 2 | 1 | 0 |

FIG. 4A

| KEY TRANSFORM FUNCTION fki | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| VALUE OF CONSTANT REGISTER | ENCRYPTION | 0 | 1 | 2 | 3 | 4 | 5 | 6 | 7 | 8 | 9 | 10 | 11 | 12 | 13 | 14 | 15 |
| | DECRYPTION | 15 | 14 | 13 | 12 | 11 | 10 | 9 | 8 | 7 | 6 | 5 | 4 | 3 | 2 | 1 | 0 |

FIG. 4B

| 48, | 54, | 216, | 182, | 175, | 5, | 130, | 229, | 107, | 52, | 86, | 11, | 12, | 221, | 14, | 15, |
|---|---|---|---|---|---|---|---|---|---|---|---|---|---|---|---|
| 59, | 4, | 41, | 140, | 22, | 164, | 7, | 89, | 124, | 81, | 225, | 176, | 101, | 66, | 30, | 118, |
| 126, | 242, | 44, | 211, | 18, | 161, | 249, | 105, | 222, | 174, | 141, | 202, | 34, | 103, | 87, | 233, |
| 71, | 49, | 187, | 51, | 39, | 1, | 91, | 77, | 181, | 172, | 55, | 42, | 199, | 79, | 62, | 194, |
| 64, | 72, | 68, | 133, | 190, | 158, | 165, | 232, | 231, | 115, | 186, | 116, | 217, | 240, | 129, | 171, |
| 74, | 169, | 204, | 173, | 57, | 58, | 93, | 17, | 159, | 245, | 241, | 155, | 92, | 156, | 94, | 26, |
| 132, | 82, | 109, | 230, | 227, | 28, | 131, | 209, | 170, | 25, | 106, | 73, | 85, | 98, | 128, | 143, |
| 237, | 108, | 160, | 61, | 21, | 179, | 254, | 197, | 38, | 122, | 235, | 70, | 125, | 31, | 40, | 102, |
| 246, | 119, | 207, | 53, | 214, | 111, | 63, | 135, | 184, | 236, | 138, | 56, | 19, | 29, | 213, | 88, |
| 144, | 145, | 243, | 127, | 148, | 137, | 189, | 151, | 78, | 153, | 123, | 183, | 114, | 157, | 255, | 252, |
| 33, | 6, | 147, | 163, | 84, | 97, | 166, | 167, | 192, | 0, | 10, | 208, | 117, | 196, | 9, | 16, |
| 27, | 206, | 177, | 104, | 195, | 83, | 24, | 75, | 150, | 203, | 188, | 50, | 100, | 69, | 20, | 180, |
| 134, | 193, | 168, | 8, | 251, | 247, | 149, | 201, | 200, | 112, | 43, | 142, | 139, | 205, | 212, | 37, |
| 60, | 226, | 210, | 154, | 239, | 80, | 244, | 215, | 3, | 120, | 45, | 23, | 67, | 99, | 219, | 223, |
| 250, | 220, | 191, | 32, | 185, | 253, | 121, | 13, | 36, | 228, | 96, | 162, | 136, | 46, | 238, | 146, |
| 110, | 178, | 152, | 2, | 90, | 234, | 95, | 65, | 248, | 113, | 224, | 35, | 76, | 218, | 198, | 47, |

FIG. 5

| NUMBER OF ROUNDS | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| ENCRYPTION (LEFT ROTATION) | 9 | 9 | 11 | 11 | 13 | 13 | 13 | 13 | 13 | 13 | 13 | 13 | 11 | 11 | 9 | 9 |
| DECRYPTION (RIGHT ROTATION) | 9 | 9 | 11 | 11 | 13 | 13 | 13 | 13 | 13 | 13 | 13 | 13 | 11 | 11 | 9 | 9 |
| KEY TRANSFORM FUNCTION fki | 1 | 2 | 3 | 4 | 5 | 6 | 7 | 8 | 9 | 10 | 11 | 12 | 13 | 14 | 15 | 16 |

FIG.6

| NUMBER OF ROUNDS | | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| PERMUTATION INPUT PROCESS | ENCRYPTION | P1 | P2 | P3 | P4 | P5 | P6 | P7 | P8 | P9 | P10 | P11 | P12 | P13 | P14 | P15 | P16 |
| | DECRYPTION | $P16^{-1}$ | $P15^{-1}$ | $P14^{-1}$ | $P13^{-1}$ | $P12^{-1}$ | $P11^{-1}$ | $P10^{-1}$ | $P9^{-1}$ | $P8^{-1}$ | $P7^{-1}$ | $P6^{-1}$ | $P5^{-1}$ | $P4^{-1}$ | $P3^{-1}$ | $P2^{-1}$ | $P1^{-1}$ |

FIG. 12

EXTENDED KEY GENERATOR, ENCRYPTION/DECRYPTION UNIT, EXTENDED KEY GENERATION METHOD, AND STORAGE MEDIUM

CROSS-REFERENCE TO RELATED APPLICATIONS

This application is based upon and claims the benefit of priority from the prior Japanese Patent Application No. 11-244176, filed Aug. 31, 1999, the entire contents of which are incorporated herein by reference.

BACKGROUND OF THE INVENTION

The present invention relates to an extended key generator, encryption/decryption unit, and storage medium, which are applied to secret key block cipher.

In the fields of recent computer and communication technologies, a cryptography technology for transmitting encrypted transmission data, and restoring the received contents by decrypting received data is prevalent. In such cipher technology, a cryptography algorithm that uses a secret key (to be referred to as a common key hereinafter) in both encryption and decryption is called common key cipher. In common key cipher, an input message is segmented into input blocks each having a fixed length, and the segmented blocks undergo randomization based on a key to generate ciphertext. As such common key cipher, a scheme called, e.g., DES (data encryption standard) is prevalently used.

In encryption based on DES, as shown in FIG. 1A, data obtained via initial permutation IP of plaintext undergoes 16 processes using round functions. Furthermore, the data that has undergone 16 rounds undergoes inverse permutation $Ip^{-1}$ of the initial permutation, thus obtaining ciphertext. On the other hand, by giving an extended key generated from the original key to each round function, a process in that round function is executed.

That is, an encryption apparatus based on DES has as principal building components a data randomization part for randomizing data to be encrypted using a large number of round functions, and a key generator for giving an extended key to each round function of the data randomization part. Note that the conventional key generator generates a key by rearranging bits using a table or wiring lines, using the same key as that of a data encryption unit, or randomly extracting from key bits.

In decryption based on DES, as shown in FIG. 1B, data to be decrypted undergoes 16 rounds in an order inverse to that upon encryption. Hence, a key generator generates extended keys in order from a key used in the last round function upon encryption.

The first merit in DES lies in the arrangement of encryption and decryption circuits; they can commonize most components. That is, as shown in FIGS. 1A and 1B, an identical circuit is used for the round functions of the data randomization part, although the input order of extended key is reversed upon encryption and decryption.

The second merit of DES is a small number of keys to be managed, since encryption and decryption are done using a single common key. In DES, in order to generate extended keys in normal and reverse orders on the basis of a sole common key, the key generator executes the following processes.

That is, a common key undergoes left rotate-shift (left rotation) to generate each extended key. Note that the total value of rotation amounts is defined to match the number of bits of the common key, and an intermediate key is finally returned to an initial state (common key). In this manner, the last extended key upon encryption can be generated to have the same value as that of the first extended key upon decryption. Upon decryption, a common key undergoes right rotate-shift (right rotation) to generate extended key in reverse order.

However, since the processes of the key generator are implemented by only permutation processes in DES, key generally called weak keys which have low security are present. Note that the weak keys mean extended keys which have identical values, and include a case wherein all extended keys K1 to K16 are equal to each other (K1=K2= ... K16), and a case wherein half extended keys K1 to K8 and K9 to K16 are equal to each other (K1=K16, K2=K15, ... , K8=K9).

However, generation of such weak keys is not a menace but can be sufficiently prevented by adding a device for removing input of a common key having a pattern for generating weak keys to an extended key generator, or adding to a cipher generation apparatus a device for determining whether or not generated extended keys are weak keys, and removing them if they are weak keys.

However, when such device that prevents generation of weak keys is added, the prices of the extended key generator and encryption/decryption unit rise, and also their circuit scales increase.

In addition to DES, a cryptosystem that can offer cryptological robustness upon using different extended keys in units of round functions by preventing generation of weak keys, and can improve the cryptological robustness has been demanded.

As described above, in the conventional extended key generator and encryption/decryption unit, when a device that prevents generation of weak keys is added to avoid low security, the prices of the extended key generator and encryption/decryption unit rise, and also their circuit scales increase.

Even when generation of weak keys is prevented, processes in the key generator does not so contribute to improvement in cryptological robustness, and improvement in cryptological robustness is demanded.

BRIEF SUMMARY OF THE INVENTION

The present invention has been made in consideration of the above situation, and has as its object to provide an extended key generator, encryption/decryption unit, extended key generation method, and storage medium, which can improve randomness of extended keys while suppressing an increase in apparatus price and circuit scale and preventing generation of weak keys, and can improve cryptological robustness.

According to the first aspect of the present invention, there is provided an extended key generator which has a plurality of cascade-connected key transform function sections for receiving different keys in units of rounds, and generating extended keys on the basis of the input keys, wherein each key transform function section comprises first key transform means for executing a transform process using a predetermined substitution table on the basis of a first key obtained from the input key, and extended key computation means for computing the extended key on the basis of a transformed result of the first key transform means, and a second key obtained from the input key.

According to another aspect of the present invention, there is provided an encryption/decryption unit which comprises an extended key generator, comprising a data randomization part for encrypting input plaintext on the basis of the extended keys generated by the key transform function sections and outputting ciphertext, and decrypting input ciphertext and outputting plaintext.

According to still another aspect of the present invention, there is provided an extended key generation method, comprising the steps of: inputting different keys (KC, kc1, . . . , kcn-1) in units of rounds;

generating a first key from the inputted key; transforming the generated first key by using a predetermined substitution table; and computing an extended key on the basis of the transformed result and a second key obtained from the inputted key.

According to still another aspect of the present invention, there is provided a computer readable storage medium which stores a program for making a computer: generate a first key from different keys (KC, kc1, . . . , kcn-1) inputted in units of rounds; transform the generated first key by using a predetermined substitution table; and compute an extended key on the basis of the transformed result and a second key obtained from the inputted key.

According to the present invention, in each key transform function section, the first key transforming means executes a transforming process using a predetermined substitution table on the basis of the first key obtained from an input key, and the extended key computing means computes an extended key on the basis of the transformed result of the first key transforming means and a second key obtained from the input key.

In this manner, since a simple arrangement without adding any external device is used, and a nonlinear transforming process using a substitution table is done upon generating each extended key, the apparatus price and scale can be suppressed and the randomness of extended keys can be improved while preventing generation of weak keys, thus improving cryptological robustness.

Furthermore, the data randomization part has a plurality of substitution tables for encryption and decryption, and one of the substitution tables of the data randomization part is common to those of the first key transforming means, thus reducing the circuit scale of the apparatus.

According to the present invention, there can be provided an extended key generator, encryption/decryption unit, extended key generation method, and storage medium, which can improve randomness of extended keys while suppressing an increase in apparatus price and circuit scale and preventing generation of weak keys, and can improve cryptological robustness.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A and 4B are views for explaining setup values of constant registers in the first embodiment;

FIG. 5 is a view for explaining the configuration of an S box in the first embodiment;

FIG. 6 is a view for explaining setups of a rotate shifter in the first embodiment;

FIG. 12 is a view for explaining setups of a substitution part in the third embodiment;

DETAILED DESCRIPTION OF THE INVENTION

The preferred embodiments of the present invention will be described hereinafter with reference to the accompanying drawings.

First Embodiment

Figures 1A, 1B:
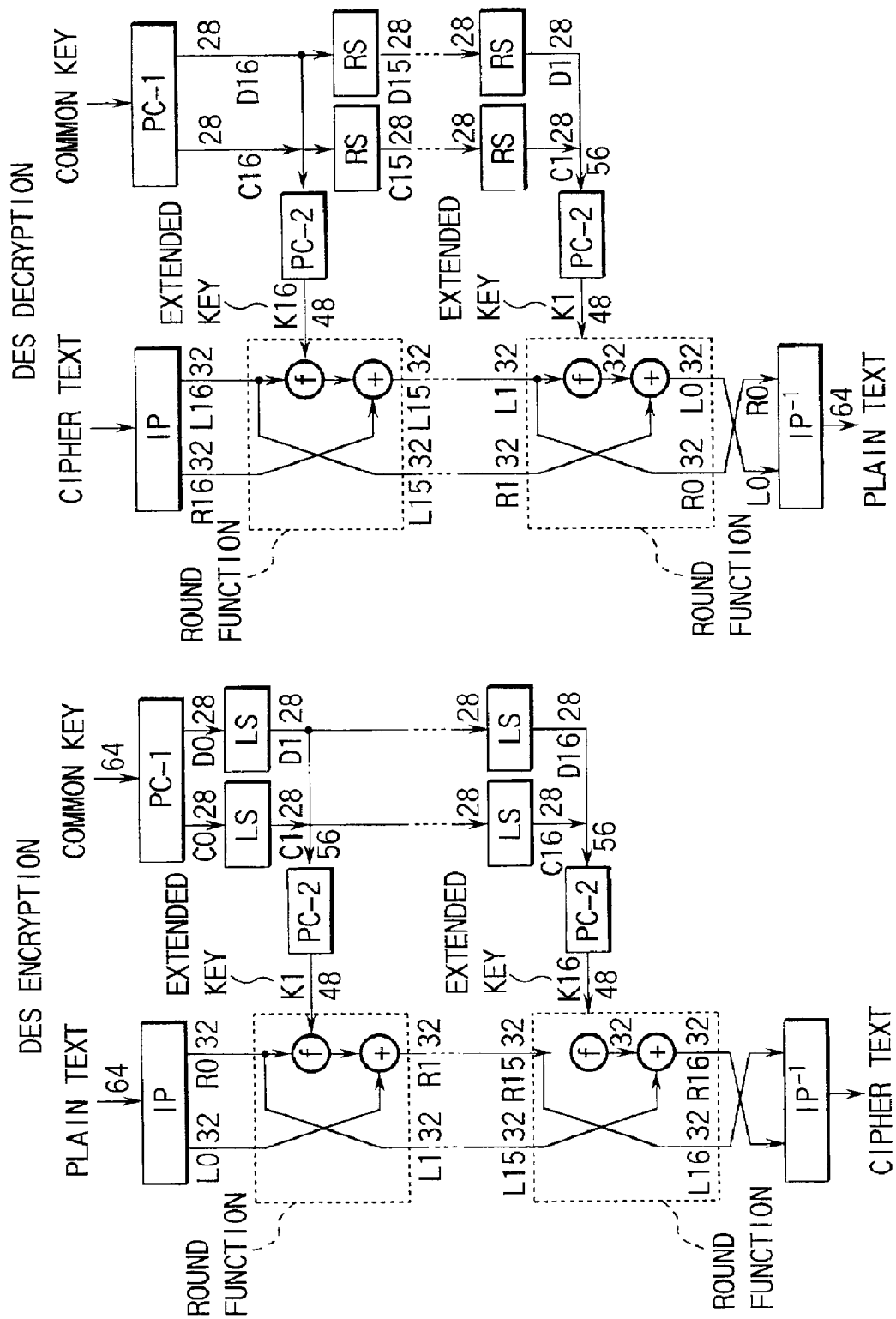
FIGS. 1A and 1B are block diagram for explaining DES as an example of conventional common key cipher.
Figure 2:
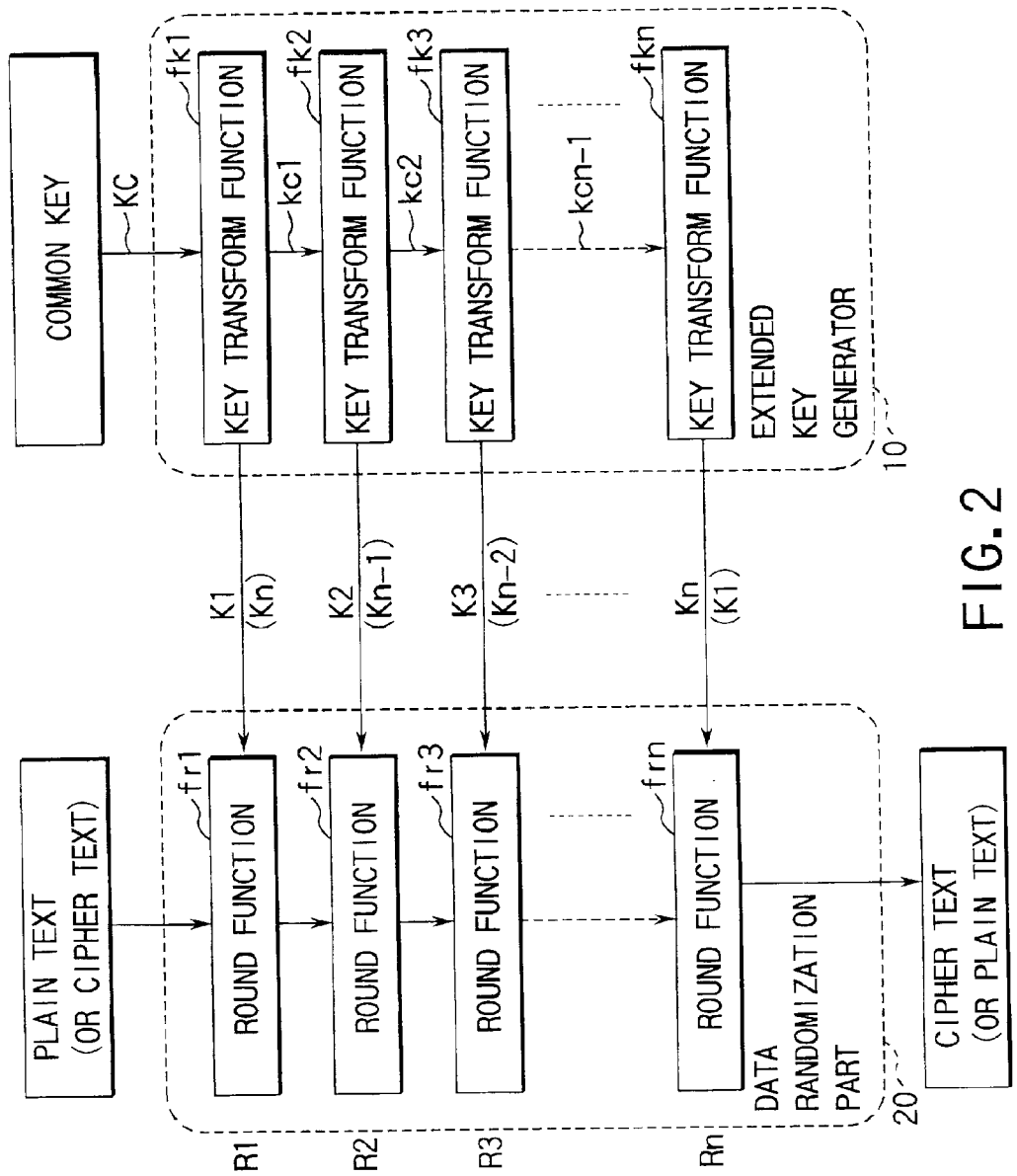
FIG. 2 is a block diagram showing the arrangement of an encryption/decryption unit according to the first embodiment of the present invention.
Figure 3:
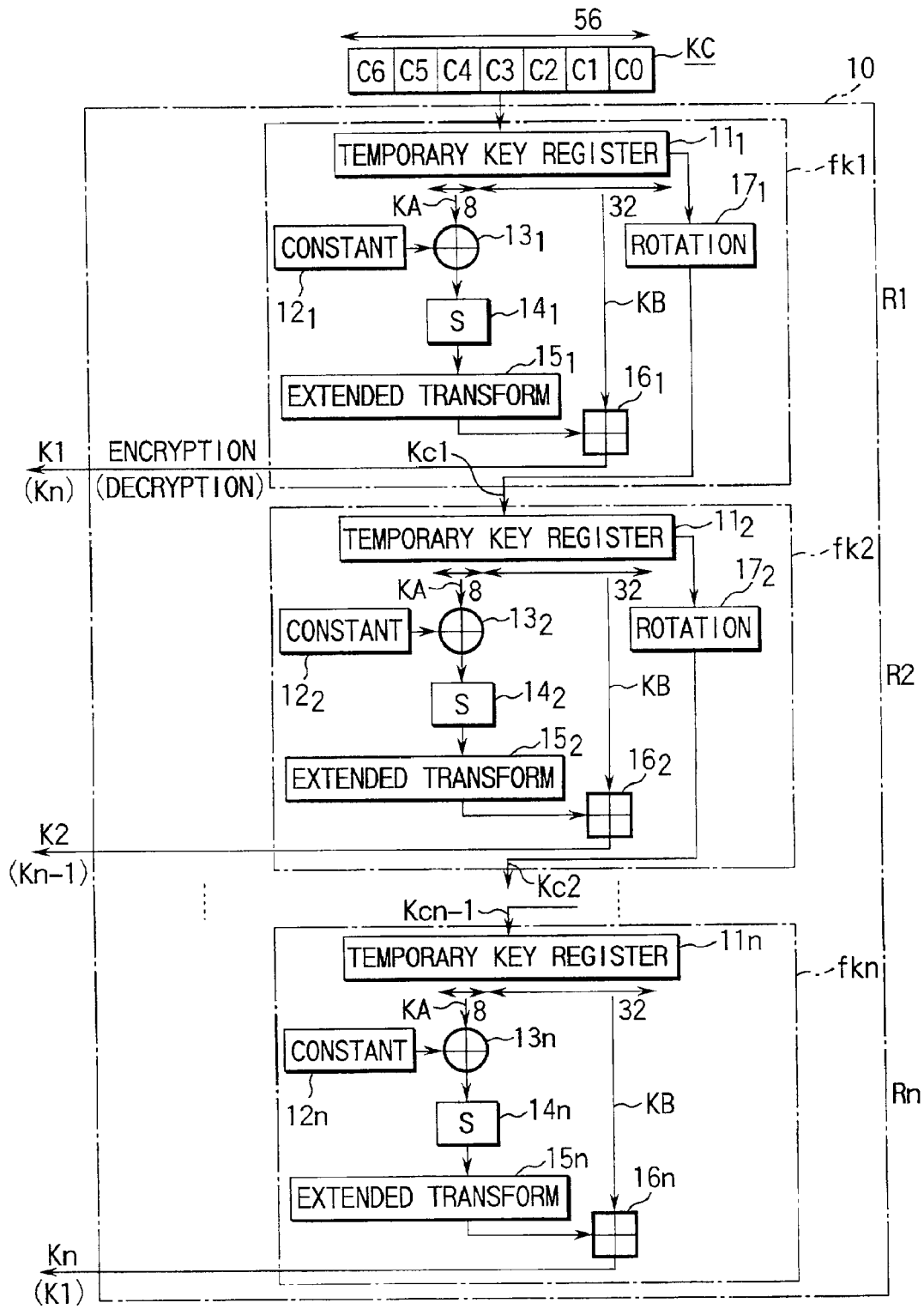
FIG. 3 is a block diagram showing the arrangement of an extended key generator in the encryption/decryption unit of the first embodiment.

FIG. 2 is a block diagram showing the arrangement of an encryption/decryption unit according to the first embodiment of the present invention, and FIG. 3 is a block diagram showing the arrangement of an extended key generator in the encryption/decryption unit shown in FIG. 2.

This encryption/decryption unit is implemented as an encryption/decryption processor for a computer such as a personal computer, workstation, or the like, and executes encryption and decryption by hardware or software. More specifically, the encryption/decryption unit comprises an extended key generator 10 for generating n extended keys K1 to Kn from a common key, and a data randomization part 20 for encrypting or decrypting using the extended keys K1 to Kn generated by the extended key generator 10 in order in rounds R1 to Rn. That is, the extended key generator 10 and data randomization part 20 are commonly used in encryption and decryption, and when the encryption/decryption unit is implemented by software, programs indicating their operations are installed in advance from a storage medium. Note that a permutation process may be inserted between the extended key generator 10 and data randomization part 20.

The extended key generator 10 has cascade-connected key transform functions fk1 to fkn (to be also simply referred to as a key transform function fk hereinafter), which respectively correspond to the rounds R1 to Rn. Upon receiving a common key KC or intermediate key transformed results kc1 to kcn-1, the key transform functions fk1 to fkn output the extended keys K1 to Kn obtained by transforming these inputs to round functions fr1 to frn of the data randomization part 20, and input separately obtained intermediate key transform functions kc1 to kcn-1 to key transform functions fk2 to fkn of the next stage.

The key transform functions fk1 to fkn respectively comprise temporary key registers $11_1$ to $11_n$, constant registers $12_1$ to $12_n$, XOR elements $13_1$ to $13_n$, S boxes $14_1$ to $14_n$, extended transformers $15_1$ to $15_n$, adders $16_1$ to $16_n$, and rotate shifters $17_1$ to $17_{n-1}$, as shown in FIG. 3. Note that a rotate shifter $17_n$ of the last stage is omitted since there is no key transform function fk(n+1) in the next stage.

The temporary key register $11_i$ (for $1 \leq i \leq n$; the same applies to the following description) holds a common key input to the extended key generator 10 or an intermediate key transformed result input from a key transform function kf(i-1) of the previous stage, and a 56-bit register is used in this embodiment.

The constant register $12_i$ is set with a constant in correspondence with the number of rounds to which a key transform function fki belongs, and can supply that constant to the XOR element $13_i$. More specifically, as shown in FIG. 4A that exemplifies the number n of rounds=16, constants to be held in the constant registers $12_i$ are symmetrically set (former and latter halves have symmetric constants) to have central values (n=8, 9) of the number of rounds as the center, since the constant registers $12_i$ must also be able to generate extended keys K1 to K16 in reverse order (K16 to K1). However, the present invention is not limited to such specific setup, and constants to be held can be arbitrarily set as long as extended keys K1 to K16 must also be able to generated in reverse order (K16 to K1). For example, as shown in FIG. 4B, constants may be reversed between encryption and decryption. Note that the constant register 12 need only set at least one of the constants to be held to be different from those of other registers, as shown in FIG. 4A. For example, the constant may be set such as CONST12i=i.

The XOR element $13_i$ computes the XOR (exclusive logical sum) of a first key KA consisting of 8-bit data in the temporary key register $11_i$, and the constant in the constant register, and inputs the obtained 8-bit computation result to the S box.

The S (substitution) box $14_i$ prevents generation of weak keys (identical extended keys in all stages). More specifically, the S box $14_i$ has a function of nonlinearly transforming an 8-bit value input from the XOR element $13_i$ and inputting the obtained 8-bit transformed result to the extended transformer $15_i$. The S box $14_i$ nonlinearly transforms using a substitution table for substituting input and output bits, as shown in, e.g., FIG. 5. For example, if input bits are (00000001), the S box $14_i$ considers that information (00000001) as binary expression, and converts that binary expression to a value "1" as decimal expression.

The S box $14_i$ then looks up the substitution table shown in FIG. 5. Assuming that "48" that appears first is the 0th element, the S box $14_i$ determines the "first" element "54" (decimal expression), and outputs (00110110) as its binary expression as output bits.

In this way, input bits (00000001) can be substituted with output bits (00110110).

Note that the substitution table shown in FIG. 5 holds the 0th to 255th elements corresponding to 256 inputs, as described above, and is used to determine a value ranging from 0 to 255 upon receiving a value ranging from 0 to 255.

Also, the S box $14_i$ is preferably commonly used as some S boxes in the round function fk to be described later to attain a scale reduction of the apparatus.

The extended transformer $15_i$ transforms the 8-bit transformed result input from the S box $14_i$ into a larger value. In this embodiment, the extended transformer $15_i$ has a function of extending the 8-bit transformed result by shifting it to the left by 4 bits and embedding "0" in lower 4 bits, and inputting the obtained 12-bit extended transformed result to the adder $16_i$.

Note that the shift amount of the extended transformer $15_i$ is preferably equivalently half (=4 bits) the number of output bits (=8) of the S box $14_i$, since the output bits of the S box $14_i$ are reflected in two S boxes S3 and S4 in the data randomization part 20. Note that the term "equivalently" means that a modification which adds an integer multiple of the number of outputs bits like 12 (=4+8×1) bit shift or 20 (=4+8×2) bit shift (in other words, a modification that has a shift amount which makes the remainder equal the number of bits half (=4) the divisor) is included in addition to 4-bit shift. When the output bits of the S box $14_i$ undergo 12-bit shift, they are reflected in S boxes S2 and S3 in place of S boxes S3 and S4; when the output bits undergo 20-bit shift, they are reflected in S boxes S1 and S2. When the output bits of the S box $14_i$ are reflected in two S boxes S3 and S4 (including S2 and S3 or S1 and S2), the combination of bits is not limited to that of 4 bits, but may be combinations of 1 bit and 7 bits, 2 bits and 6 bits, or 3 bits and 5 bits may be used in any order. That is, equivalent 1 to 3 and 5 to 7 bit shifts may be used in addition to equivalent 4-bit shift.

The adder $16_i$ has a function of adding (normal addition with carry-up) the 12-bit extended transformed result input from the extended transformer $15_i$ and a second key KB consisting of 32-bit data in the temporary key register $11_i$, and inputting the obtained sum (32 bits (carried out (bit) is ignored) to the round function fri of the data randomization part 20 as an extended key Ki of a round Ri.

Note that the first and second keys KA and KB are individually extracted from continuous areas of the temporary key register $11_i$. However, the present invention is not limited to this, and these keys may be extracted from discontinuous areas. That is, the first key KA can be a total of arbitrary 8-bit data in the temporary key register $11_i$, and the second key KB can be a total of arbitrary 32-bit data in the temporary key register $11_i$. The first and second keys KA and KB may overlap each other. Note that the bit length of the first key KA is preferably equal to the input bit length of the S box of the data randomization part 20 to commonly use the S boxes. The bit length of the second key KB is preferably equal to that of the extended key K1 to simplify design (note that the bit length of the second key KB may be different from that of the extended key K1, as needed, and in such case, the bit length of the extended key Ki can be finally adjusted by, e.g., contracted or extended permutation).

The rotate shifter $17_i$ rotates the value of the temporary key register $11_i$ by a predetermined shift amount, and inputs the rotated value to a temporary key register $11_{i+1}$ of the next stage. In this embodiment, shift amounts are in units of key transform functions fk1 to fkn, as shown in FIG. 6. Note that the shift amount of the rotate shifter $17_i$ is preferably relatively prime to at least either the number of bits of the common key KC or the number of output bits of the S box $14_i$ so as to improve randomness of keys, and these three values are most preferably prime to each other. The shift amounts are symmetrically set (former and latter halves have symmetric constants) to have a central value (n=8) of the key transform functions fk1 to fk(n+1) except for the last stage, since extended keys K1 to K16 must also be able to generate extended keys K1 to K16 in reverse order (K16 to K1). However, the present invention is not limited to such specific setup, and the shift amounts and rotation direction of the rotate shifters $17_i$ can be arbitrarily set as long as extended keys K1 to K16 are also able to generate extended keys K1 to K16 in reverse order (K16 to K1).

On the other hand, the data randomization part 20 has an encryption function of encrypting input plaintext and outputting ciphertext when it receives extended keys K1 to K16 in order from the extended key generator 10 in n rounds from rounds R1 to Rn. On the other hand, the part 20 has a decryption function of decrypting input ciphertext and outputting plaintext when it receives extended keys K16 to K1 from the extended key generator 10 in an order reverse to that in encryption. The data randomization part 20 has the round functions fr1 to frn which are cascade-connected in order in correspondence with the rounds R1 to R16.

The round function fri is a function of transforming plaintext or an intermediate encrypted result on the basis of the extended key Ki input from the extended key generator 10, and outputting an intermediate encrypted result or ciphertext in encryption, and is also a function of transforming ciphertext or an intermediate decrypted result on the basis of the extended key K(n+1−i) input in reverse order from the extended key generator 10, and outputting an intermediate decrypted result or plaintext in decryption process. In this embodiment, for example, the round function fri uses the Feistel structure shown in FIG. 7.

Figure 7:
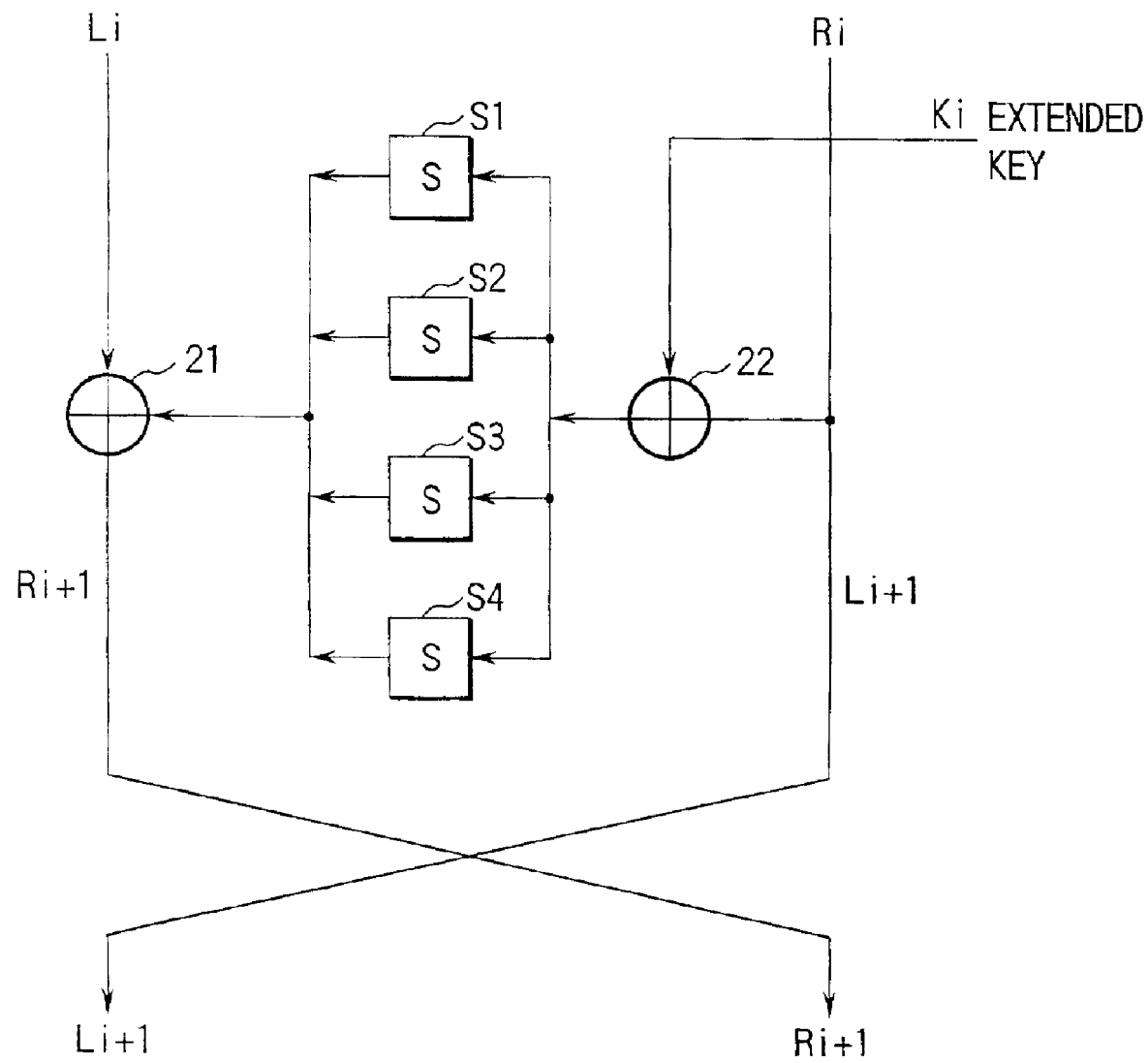
FIG. 7 is a block diagram showing the structure of a round function in the first embodiment.

The Feistel structure shown in FIG. 7 comprises the following arrangement. That is, of input data blocks made up of two subblocks Li and Ri, one subblock Ri is nonlinearly transformed using an F function on the basis of the extended key Ki, the XOR of this transformed result and the other subblock Li is computed by an XOR element 21, and the computation result Ri+1 and one subblock Li+1 (=Ri) are supplied to the next stage while interchanging their positions.

Note that the F function in FIG. 7 comprises an XOR element 22 that XORs the extended key K and subblock Ri (or Li), and four S boxes S1 to S4 for segmenting the output from the XOR element 22 into four elements, and respectively nonlinearly transforming these elements. Note that the S boxes S1 to S4 have a substitution table shown in, e.g., FIG. 5, and the respective S boxes may have a common substitution table but may have different ones.

Note that transformation done by each round function fr has a nature called involution, i.e., that original data is restored when identical transformation repeats itself twice. For this reason, when ciphertext is generated by transforming plaintext in the order of extended keys K1 to K16, the data randomization part 20 can generate plaintext by re-transforming this ciphertext in the order of extended keys K16 to K1.

The operation of the encryption/decryption unit with the aforementioned arrangement will be explained below also with reference to the flow chart shown in FIG. 8.

Upon encryption, as shown in FIG. 2, an input common key KC or intermediate key transformed result kci is transformed into an extended key Ki in each round using the key transform function fki.

Figure 8:
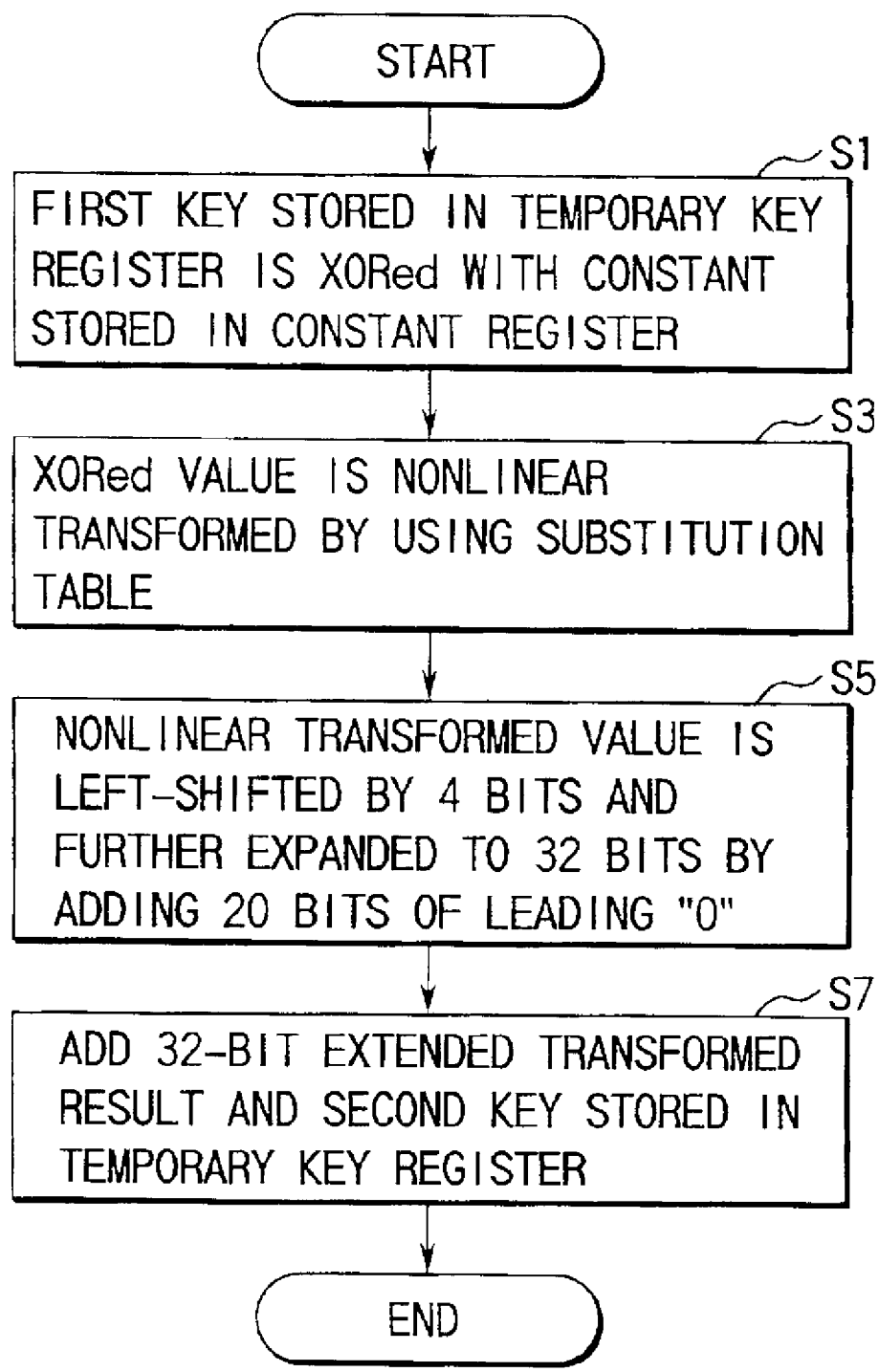
FIG. 8 is a flow chart showing the operation of the encryption/decryption unit.
Figure 9:
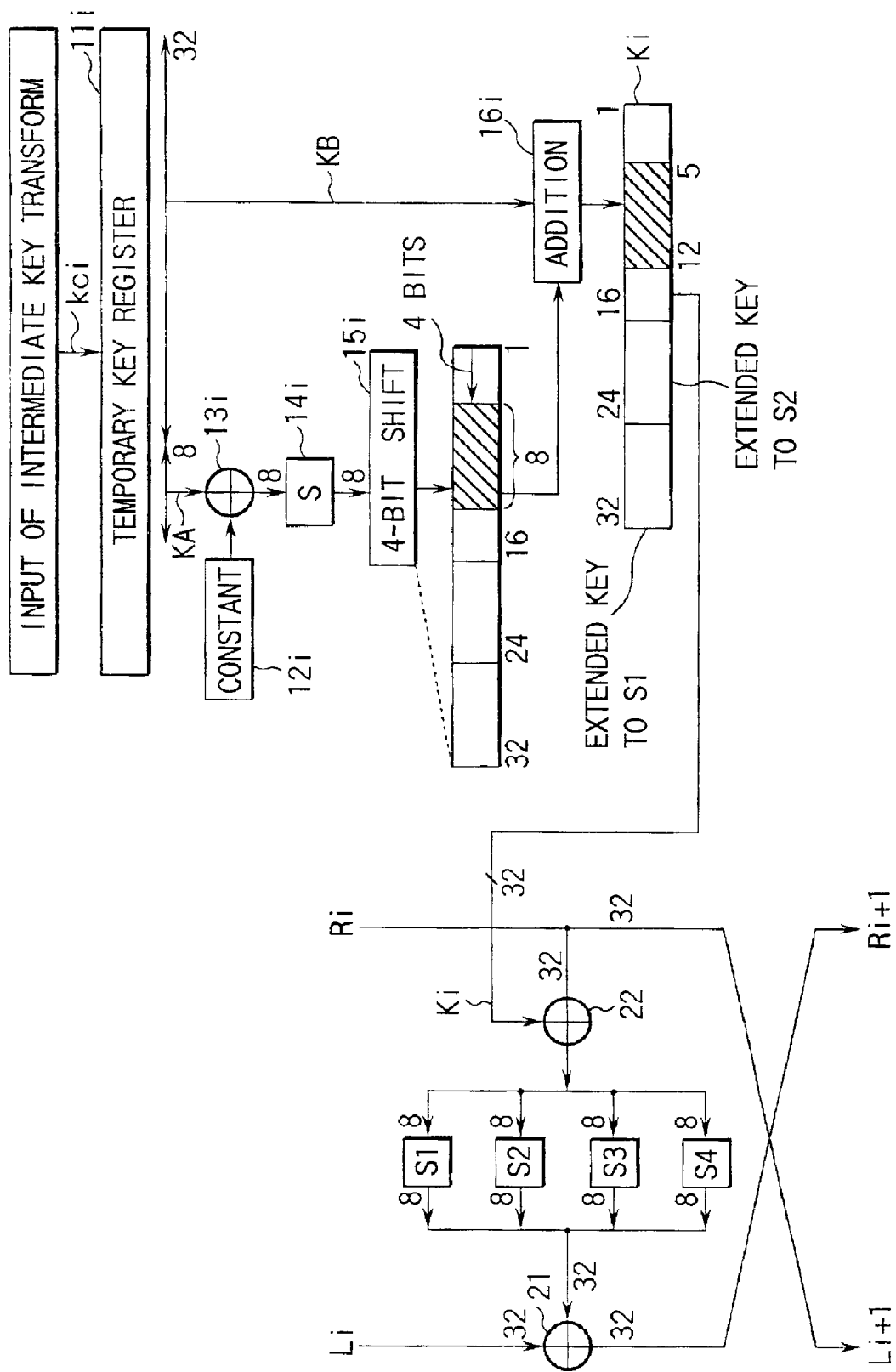
FIG. 9 is a diagram for explaining the operation in the first embodiment.

More specifically, as shown in FIG. 9, in the key transform function fki, the XOR element $13_i$ XORs the 8-bit first key KA extracted from the temporary key register $11_i$, and a constant in the constant register $12_i$ (step S1 in FIG. 8), and the S box $14_i$ linearly transforms this XOR (step S3 in FIG. 8). As nonlinear transformation, the input and output are substituted in units of bits to have the relationship shown in, e.g., FIG. 5. This substitution result is left-shifted by 4 bits (=16 times) by the extended transformer $15_i$ to obtain 12 bits of data. Furthermore, the substitution result is expanded to 32 bits by adding 20 bits of leading "0." The 32-bit substitution result is then input to the adder $16_i$ (step S5 in FIG. 8).

The adder $16_i$ adds the input shift result (32 bits) and the 32-bit second key KB extracted from the temporary key register $11_i$, and outputs the sum as the 32-bit extended key Ki to the data randomization part 20 (step S7 in FIG. 8).

In this extended key Ki, the 8-bit first key KA transformed by the S box $14_i$ is located at the 5th to 12th bits from the right (least significant bit). These bit positions correspond to an input to the third and fourth S boxes S3 and S4. Hence, the randomization effect of the S box $14_i$ in the extended key generator 10 can be reflected in the two S boxes S3 and S4 in the data randomization part 20, thus improving randomness of the extended key.

In the data randomization part 20, plaintext is transformed based on extended keys K1 to Kn in units of round functions fr1 to frn, and is finally transformed into ciphertext via intermediate encrypted results.

On the other hand, upon decryption, the extended key generator 10 executes key transform processes in reverse order to that in encryption upon receiving the common key KC as in the aforementioned case, and sequentially outputs extended key Kn to K1 to the data randomization part 20.

The data randomization part 20 transforms the input ciphertext on the basis of the extended keys Kn to K1 in reverse order to that in encryption, and finally transforms it into plaintext via intermediate decrypted results.

To restate, according to this embodiment, each of the key transform function fk1 to fkn executes a nonlinear transform process using the S box $14_i$ (substitution table) on the basis of the first key KA obtained from the input key, and the adder $16_i$ computes a corresponding one of the extended keys K1 to K16 on the basis of the value obtained by left-shifting the transformed result of the S box $14_i$, and the second key KB obtained from the input key.

In this manner, a simple arrangement without any additional external device is used, and a nonlinear transform process using the substitution table (S box $14_i$) is done upon generating the extended key Ki. Hence, the apparatus price and scale can be suppressed, and randomness of extended keys can be improved while preventing generation of weak keys, thus improving cryptological robustness.

In each key transform function fki, since the rotate shifter $17_i$ rotate-shifts the input key to the left (or right), and inputs the rotate-shifted key to the key transform function fk(i+1) of the next round, keys input to the respective rounds can become easily and reliably different from each other.

Furthermore, assuming that the shift amount of the rotate shifter $17_i$ is relatively prime to, e.g., the number of output bits of the S box $14_i$, nearly all first keys KA in the rounds R1 to Rn can be different from each other, and the aforementioned effect can be obtained more easily and reliably.

Furthermore, in each key transform function fki, since the extended transformer $15_i$ extends and transforms the transformed result of the S box $14_i$, and inputs the result to the adder $16_i$, the randomization effect of the first key KA can be reflected in an arbitrary area of the extended key Ki in addition to the aforementioned effects.

Since extended transformation of the extended transformer $15_i$ is implemented by shifting the predetermined number of bits, the aforementioned effects can be easily and reliably obtained.

Furthermore, since the data randomization part 20 has a plurality of S boxes S1 to S4 for encryption and decryption, and some S boxes of the data randomization part 20 are common to the S boxes $14_i$ of the key transform functions fk1 to fkn, the device scale can be reduced.

In each of the key transform function fk1 to fkn, since the extended transformer $15_i$ shifts to the left the transformed result received from the S box $14_i$ by the number of bits half that of the transformed result or the number of bits obtained by an integer multiple of the number of bits of the transformed result to the half number of bits, and inputs the shift result to the adder $16_i$, the randomization effect of the first key KA can be reflected in an area left-shifted by the extended key Ki. In this case, since the randomization effect of the first key KA can be reflected in an area input to the S boxes S3 and S4 of the data randomization part 20, cryptological robustness can be further improved.

Second Embodiment

Figure 10:
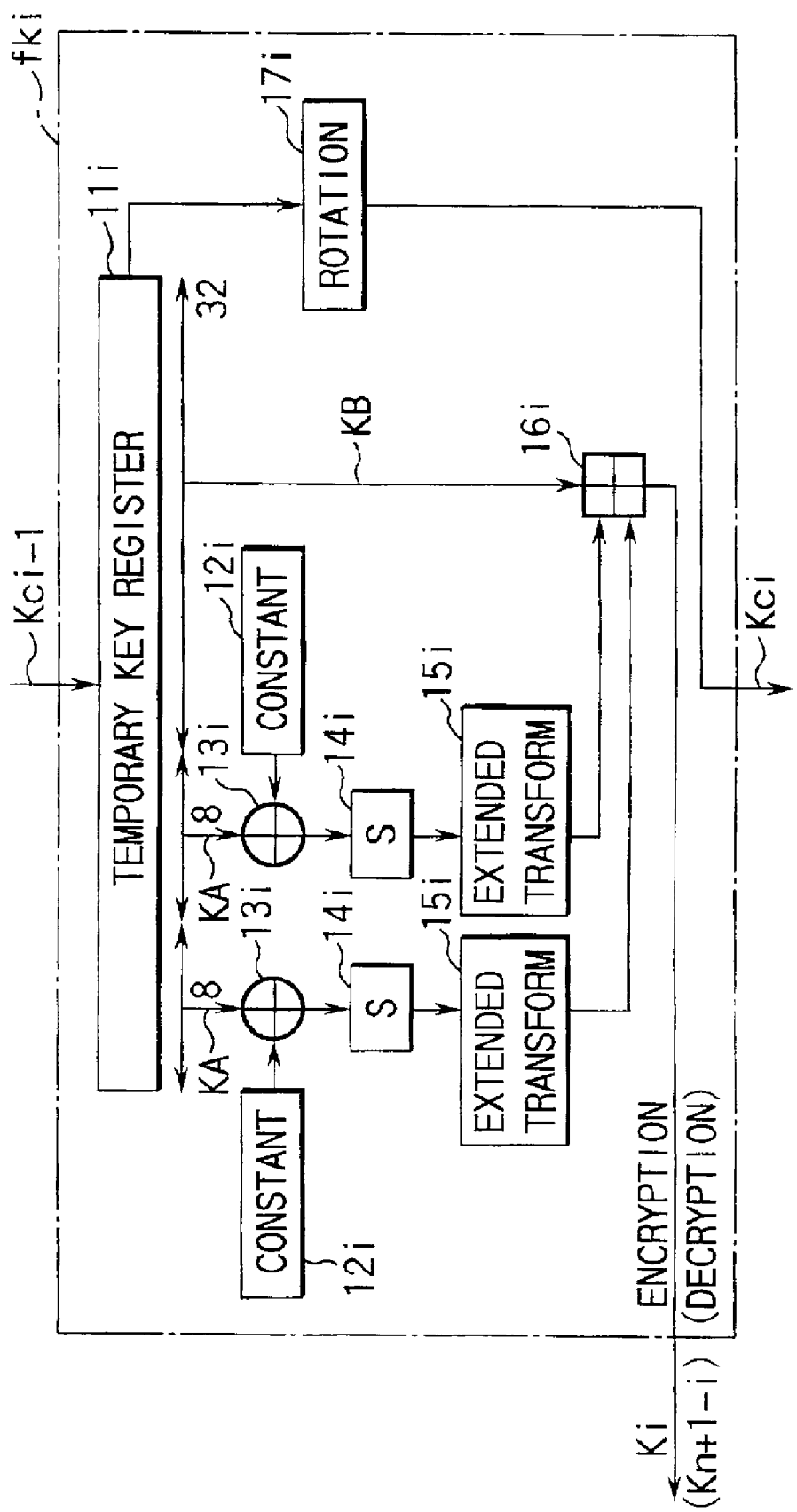
FIG. 10 is a block diagram showing the arrangement of a key transform function applied to an extended key generator according to the second embodiment of the present invention.

FIG. 10 is a block diagram showing the arrangement of a key transform function applied to an extended key generator according to the second embodiment of the present invention. The same reference numerals in FIG. 10 denote the same parts as those in FIG. 3, a detailed description thereof will be omitted, and only differences will be explained below. Note that a repetitive description will also be avoided in the embodiments to be described later.

That is, this embodiment is a modification of the first embodiment, and aims at further improving randomness of extended keys. More specifically, in each key transfer function, the aforementioned transform elements including the constant registers $12_i$, XOR elements $13_i$, S boxes $14_i$, and extended transformers $15_i$ are parallelly connected between the temporary key register $11_i$ and adder $16_i$, as shown in FIG. 10.

The two S boxes $14_i$ may be of either one type or a plurality of types. When a plurality of types of S boxes are used, those types are preferably set so that the former group of key transform functions fk1 to fk8, and the latter group of key transform functions fk9 to fk16 become vertically symmetrical from the central values (fk8 and fk9), since extended keys Ki must be able to be generated in both normal and reverse orders on the basis of the common key KC.

The two extended transformers $15_i$ may have identical shift amounts. Since the randomization effect of the two S boxes $14_i$ must be reflected over a broader range, the outputs from the S boxes $14_i$ are preferably shifted to the left using different shift amounts. In this case, if one extended transformer $15_i$ is set to implement 4-bit left shift, and the other extended transformer $15_i$ is set to implement 20-bit left shift, the randomization effect of the first key KA can be conveniently reflected in all the S boxes S1 to S4 of the data randomization part 20.

With the aforementioned arrangement, since randomness using the first key KA can be further improved, the randomness of extended keys Ki can be further improved in addition to the effects of the first embodiment.

Third Embodiment

Figure 11:
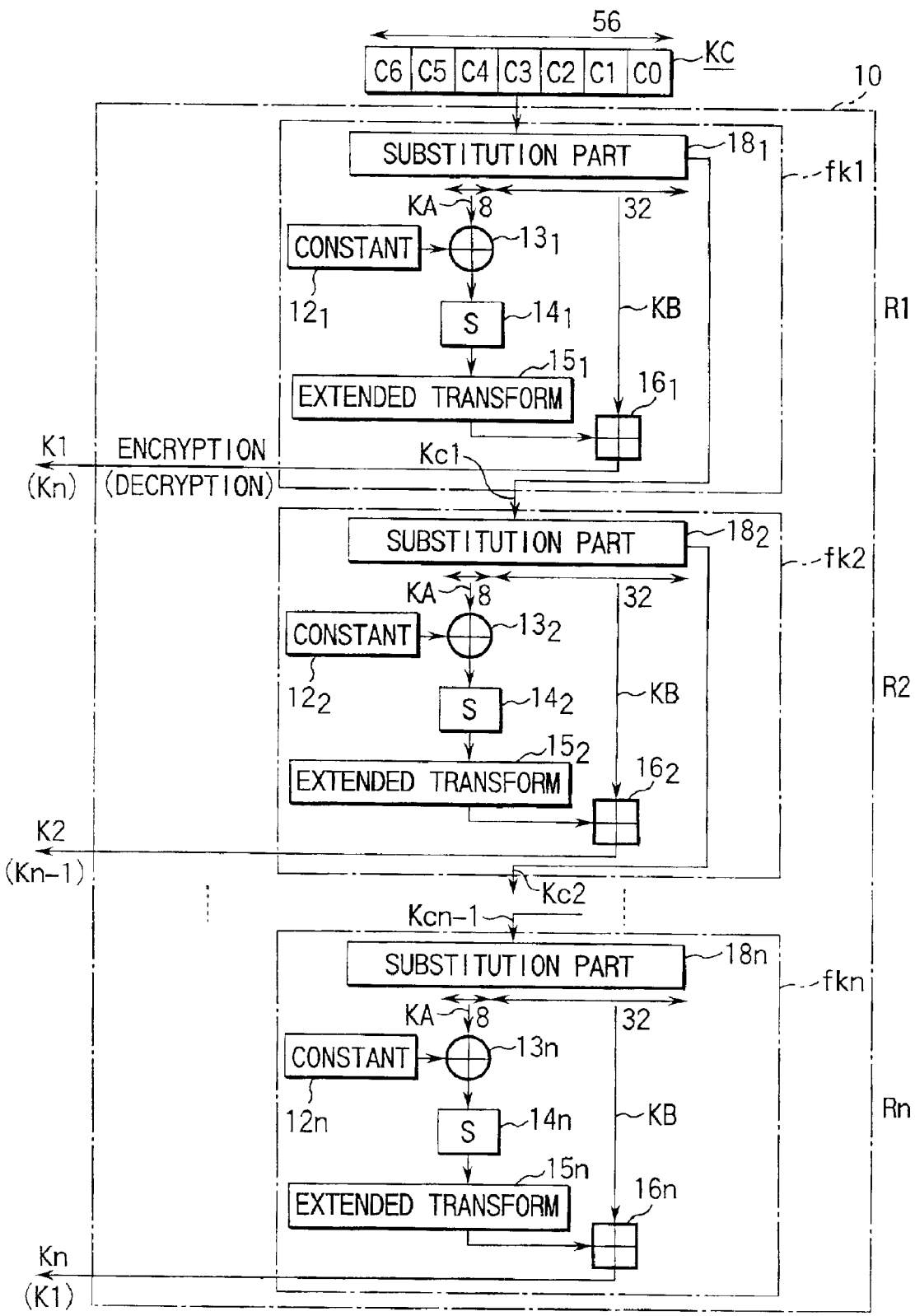
FIG. 11 is a block diagram showing the arrangement of an extended key generator according to the third embodiment of the present invention.

FIG. 11 is a block diagram showing the arrangement of an extended key generator according to the third embodiment of the present invention.

This embodiment is a modification of the first or second embodiment, and comprises, in place of the temporary shift register $11_i$ and rotate shifter $17_i$, a substitution part $18_i$ which nonlinearly substitutes respective bits of an input common key KC or one of intermediate keys kc1 to kcn-1, inputs some bits of the obtained intermediate key to the XOR element $13_i$ and adder $16_i$ of the own stage, and also inputs the whole intermediate key to a substitution part $18_{(i+1)}$ of the next stage. Note that the substitution part $18_1$ does not substitute respective bits of the input common key KC.

The respective substitution parts $18_i$ are set so that the result after n substitutions of the common key KC in normal order becomes equal to the original common key KC, since they must be able to generate extended keys Ki on the basis of the common key KC in both normal and reverse orders. Also, transformation is done in ascending order upon encryption, and inverse transformation is done in descending order upon decryption, as shown in FIG. 12 that exemplifies the number n of rounds=16. For example, the process of each substitution part $18_i$ is implemented by rotate-shifting the common key KC to the left by an arbitrary number of bits.

Figure 13:
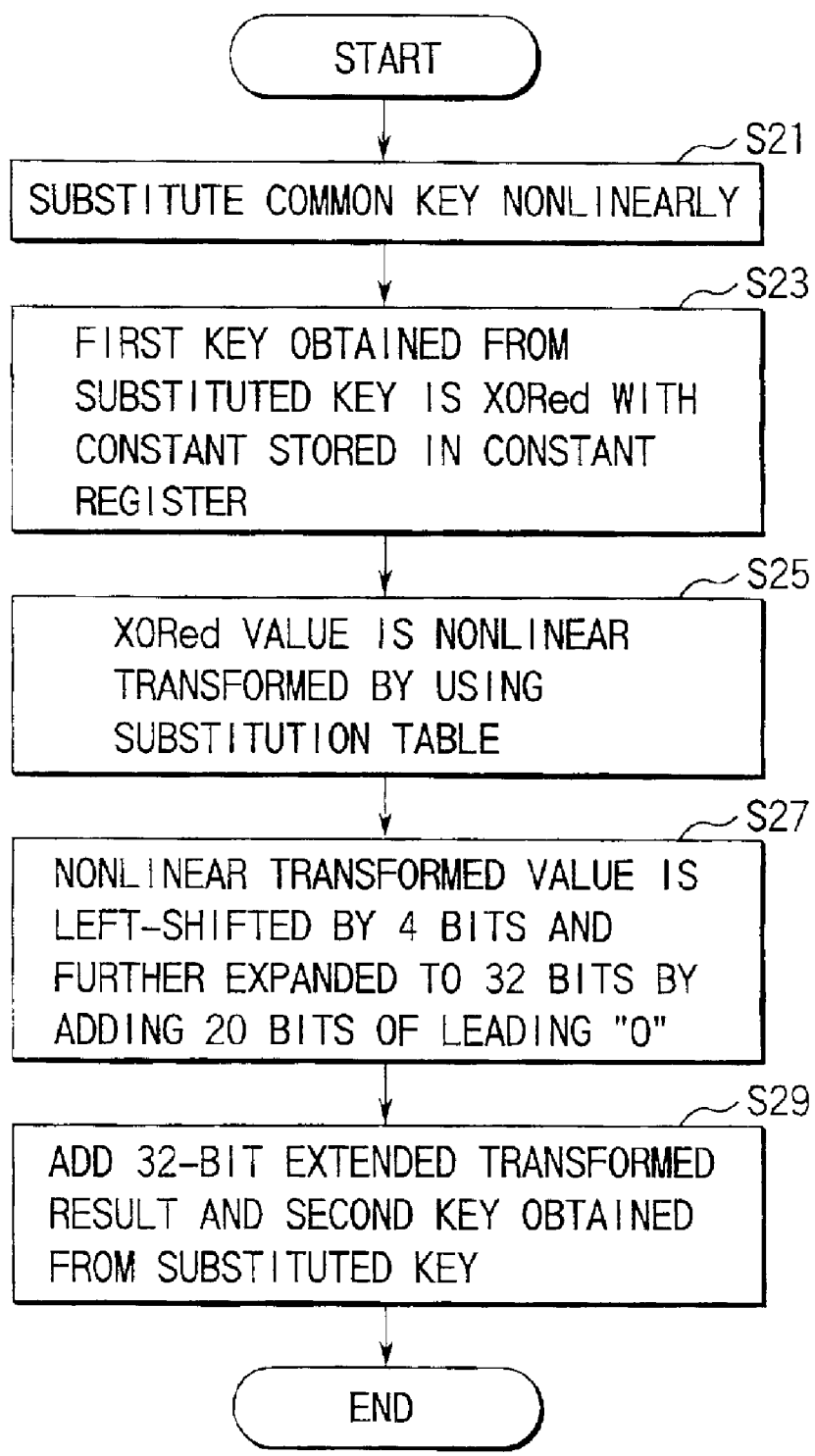
FIG. 13 is a flow chart showing the operations of the embodiment shown in FIG. 11.

In the embodiment shown in FIG. 11, each substitution part $18_i$ executes a process for nonlinearly transforming the common key KC in step S21 in FIG. 13. In step S23, the XOR element $13_i$ XORs a first key KA obtained from the substitution part $18_i$ and a constant held in the constant register $12_i$. In step S25, the S box $14_i$ nonlinearly transforms the XOR output from the XOR element $13_i$ using a substitution table. In step S27, the extended transformer $15_i$ shifts the nonlinearly transformed value to the left by 4 bits, thus obtaining a 12-bit extended transformed result. Furthermore, the 12-bit transformed result is expanded to 32 bits by adding 20 bits of leading "0". In step 529, the 32-bit extended transformed result is added to a second key KB obtained from the substitution part $18_i$ to generate an extended key.

With this arrangement as well, the same effects as in the first or second embodiment can be obtained. In addition, the keys KC and kc1 to kcn-1 to be input to the key transform functions fk1 to fkn can become easily and reliably different from each other.

In the above embodiments, the XOR element $13_i$ for XORing the constant is connected to the input side of the S box $14_i$. However, the present invention is not limited to such specific arrangement. For example, the XOR element $13_i$ may be omitted, and an S box $14x_i$ after the XOR with a constant is computed may be provided in place of the S box $14_i$, thus similarly practicing the present invention and obtaining the same effect. More specifically, the XORs of the value KA and constants may be computed in advance and are held in the form of a table, and the S box $14x_i$ may look up the table using the value KA as an input parameter to obtain a given XOR.

Figure 14:
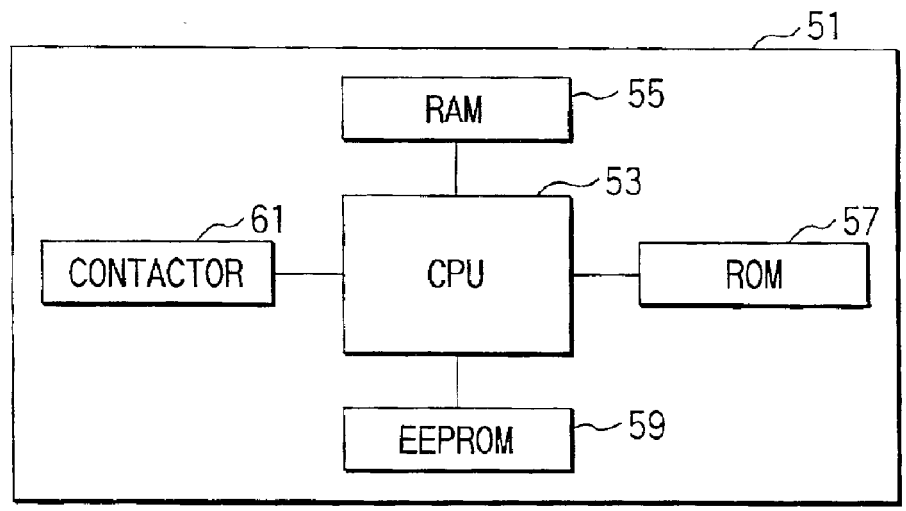
FIG. 14 is a functional block diagram showing the arrangement of a smart card that embodies the extended key generator, encryption/decryption unit, and storage medium of the present invention.

FIG. 14 is a functional block diagram showing the arrangement of a smart card that embodies the aforementioned extended key generator, encryption/decryption unit, and storage medium of the present invention. As shown in FIG. 14, a smart card 51 has a CPU 53, RAM 55, ROM 57, EEPROM 59, and contactor 61. The RAM 55 is used to store various data, and is used as a work area or the like. The ROM 57 is used to store various data, programs, and the like. The EEPROM 59 stores programs and the like shown in the flow charts in FIGS. 8 and 13. The contactor 61 obtains electrical contacts with a smart card reader/writer (not shown). Note that the programs shown in FIGS. 8 and 13 may be stored in the RAM 55 or ROM 57 in place of the EEPROM 59.

Fourth Embodiment

An encryption/decryption unit according to the fourth embodiment of the present invention will be described below using FIG. 15. This encryption/decryption unit 30 has an arrangement described in one of the first to third embodiments, and is used to protect digital information such as image data, music data, and the like (to be referred to as raw data hereinafter).

Figure 15:
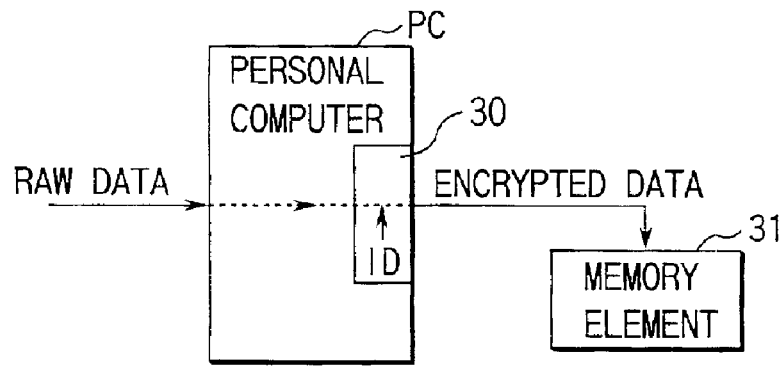
FIG. 15 is a diagram for explaining an encryption/decryption unit according to the fourth embodiment of the present invention.

Assume that the encryption/decryption unit 30 is implemented on a personal computer PC by installing a program from a storage medium, as shown in FIG. 15. The encryption/decryption unit 30 encrypts raw data input to the personal computer PC using, e.g., a user ID as a common key, and stores the obtained encrypted data (corresponding to the aforementioned ciphertext) in a portable memory element 31. AS such memory element 31, a smart card, smart media, memory card, or the like may be used.

The memory element 31 is distributed to the user's home, and an encryption/decryption unit (not shown) in the user's home decrypts the encrypted data in the memory element 13 on the basis of the self user ID and reproduces obtained image data or music data from, e.g., a loudspeaker or the like. In this manner, raw data (contents) can be distributed to only users who have made a subscription contract in advance.

Figure 16:
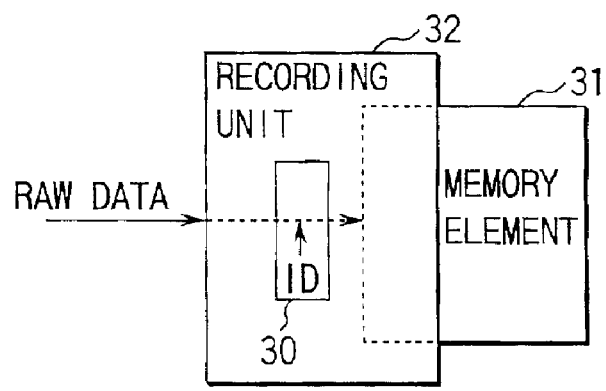
FIG. 16 is a diagram for explaining a modification of the fourth embodiment.

Various modifications of this embodiment are available as follows. For example, as shown in FIG. 16, a recording unit 32 comprising the encryption/decryption unit 30 as a hardware circuit may be provided in place of the personal computer PC. With this arrangement, upon writing contents in the memory element 31, the encryption/decryption unit 30 encrypts raw data based on, e.g., a user ID, and stores encrypted data in the memory element 31. The processes from delivery to the home to decryption are the same as those described above. In this manner, the encryption/decryption unit 30 may be provided to the dedicated recording unit 32 in place of a versatile computer such as the personal computer PC and the like.

Figure 17:
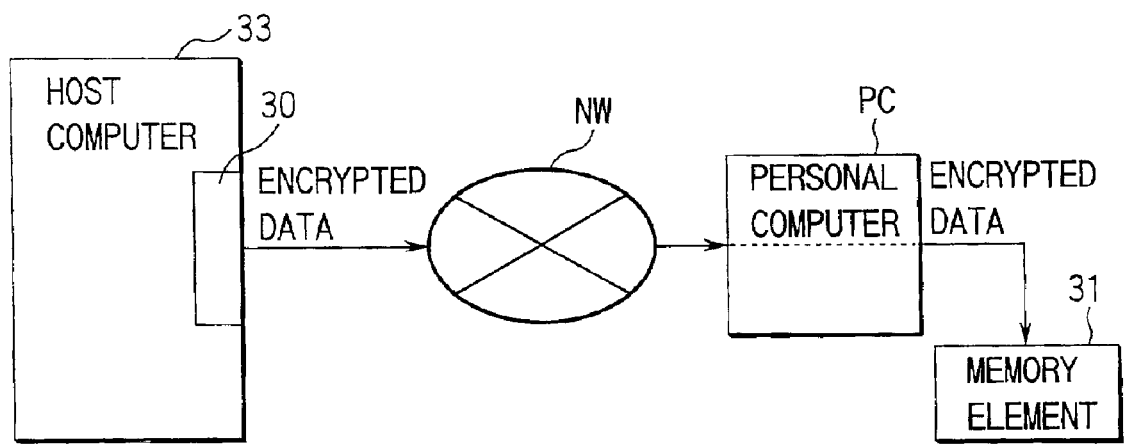
FIG. 17 is a diagram for explaining another modification of the fourth embodiment.

Also, as shown in FIG. 17, a host computer 33 with the encryption/decryption unit 30 may be connected to the personal computer PC via a network NW. In this case, encrypted data downloaded from the host computer 33 is stored in the memory element 32 via the personal computer PC in the encrypted state. The processes from delivery to the home to decryption are the same as those described above.

According to this modification, in addition to the aforementioned effect, contents (raw data) on the network NW can be prevented from eavesdropped.

Figure 18A:
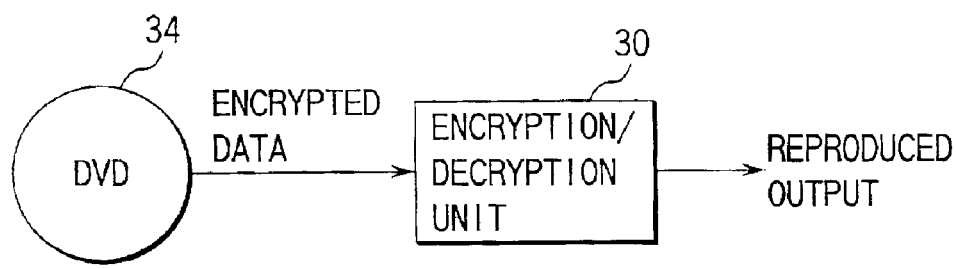
FIGS. 18A and 18B are diagrams for explaining modifications of the fourth embodiment.
Figure 18B:
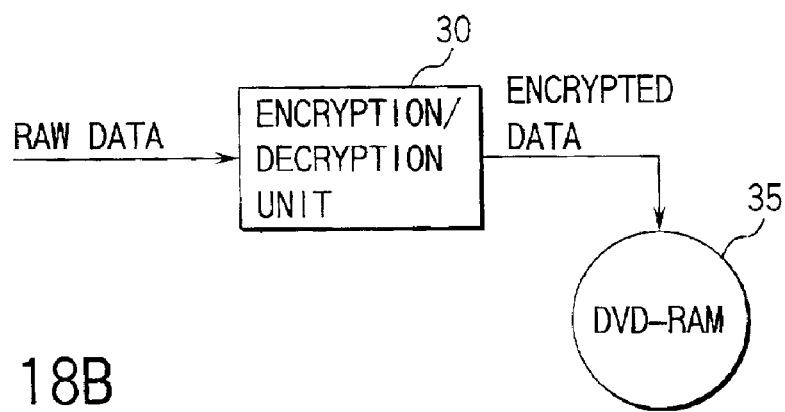

Furthermore, as shown in FIGS. 18A and 18B, a DVD (digital versatile disc) may be used as the memory element. In the case shown in FIG. 18A, a DVD 34 that pre-stores encrypted data is distributed to the user. The encryption/decryption unit 30 at the user's home decrypts the encrypted data in the DVD 34, and reproduces obtained image data or music data from a loudspeaker or the like.

Also, in the case shown in FIG. 18B, raw data such as image data, music data, or the like is encrypted by the encryption/decryption unit 30 at the user's home using a predetermined common key, and the obtained encrypted data is stored in a DVD-RAM 35.

This encrypted data is decrypted by the predetermined common key set by the user, but cannot be decrypted by a third party unless the common key is disclosed. Therefore, personal image data and music data can be saved while being protected from third parties.

Other Embodiments

As a storage medium that stores a program for implementing the processes of the extended key generator and encryption/decryption unit of the present invention, a magnetic disk, floppy disk, hard disk, optical disk (CD-ROM, CD-R, DVD, or the like), magnetooptical disk (MO or the like), semiconductor memory, and the like may be used. In practice, the storage format is not particularly limited as long as a storage medium can store the program and can be read by a computer.

An OS (operating system) which is running on a computer or MW (middleware) such as database management software, network software, or the like may execute some of processes that implement the above embodiment, on the basis of an instruction of the program installed from the storage medium in the computer.

Furthermore, the storage medium in the present invention is not limited to a medium independent from the computer, but includes a storage medium which stores or temporarily stores a program downloaded from a LAN, the Internet, or the like.

The number of storage media is not limited to one, and the storage medium of the present invention includes a case wherein the processes of the above embodiment are implemented from a plurality of media, and either medium arrangement may be used.

Note that the computer in the present invention executes processes of the above embodiment on the basis of programs stored in the storage medium, and can be either an apparatus consisting of a single device such as a personal computer, or a system built by connecting a plurality of devices via a network.

The computer in the present invention is not limited to a personal computer, and includes an arithmetic processing device, microcomputer, and the like included in an information processing apparatus, i.e., includes all devices and apparatuses that can implement the functions of the present invention via programs.

The present invention is not limited to a DES cryptosystem but can be applied to any other block cryptosystems using round functions. For example, the present invention may be applied to cryptosystems such as Lucifer, LOKI, MISTY1, MISTY2, and SAFER (Secure and Fast Encryption Routine), and the like.

In the above embodiments, the S box makes nonlinear transformation using a substitution table. Alternatively, the S box may make nonlinear transformation using a wiring pattern.

In the embodiment shown in FIG. 10, two sets of transform elements including the constant registers $12_i$, XOR elements $13_i$, S boxes $14_i$, and extended transformers $15_i$ are parallelly arranged. Alternatively, three or more sets of transform elements may be parallelly arranged.

Various other modifications of the present invention may be made within the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An expansion key generation apparatus, which generates expansion keys based on input keys, the apparatus comprising a plurality of cascade-connected key transform devices, each of the key transform devices comprising:

an exclusive-OR element for calculating an exclusive-OR of a constant determined for each of the key transform devices and a first key obtained from the input key;

a nonlinear transform unit for nonlinearly transforming an output from the exclusive-OR element using a predetermined substitution table;

an expansion unit for performing an expansion processing on an output from the nonlinear transform unit; and an expansion key calculation unit for calculating the expansion key based on an output from the expansion unit and a second key obtained from the input key, wherein the expansion key calculation unit adds with carry-up the output from the expansion unit and the second key.

2. An expansion key generation apparatus, which generates expansion keys based on input keys, the apparatus comprising a plurality of cascade-connected key transform devices, each of the key transform devices comprising:

an exclusive-OR element for calculating an exclusive-OR of a constant determined for each of the key transform devices and a first key obtained from the input key;

a nonlinear transform unit for nonlinearly transforming an output from the exclusive-OR element using a predetermined substitution table;

an expansion unit for performing an expansion processing on an output from the nonlinear transform unit; and an expansion key calculation unit for calculating the expansion key based on an output from the expansion unit and a second key obtained from the input key, wherein the expansion key calculation unit performs a shifting of a predetermined number of bits and shifts the output from the nonlinear transform unit to the least significant bit by the number of bits that is half the number of bits of the output from the nonlinear transform unit, or by the number of bits obtained by adding an integer multiple of the number of bits of the output from the nonlinear transform unit to the half number of bits.

3. An expansion key generation program, which causes a computer to generate expansion keys based on input keys using a plurality of cascade-connected key transform devices, the program comprising:

program code for calculating an exclusive-OR of a constant determined for each of the key transform devices and a first key obtained from the input key;

program code for nonlinearly transforming a result of an exclusive-OR using a predetermined substitution table;

program code for performing an expansion processing on a result of a nonlinear transform; and program code for calculating the expansion key based on a result of expansion processing and a second key obtained from the input key, wherein the program code for calculating the expansion key comprises program code for adding with carry-up a result of an expansion and the second key.

4. An expansion key generation program, which causes a computer to generate expansion keys based on input keys using a plurality of cascade-connected key transform devices, the program comprising:

program code for calculating an exclusive-OR of a constant determined for each of the key transform devices and a first key obtained from the input key;

program code for nonlinearly transforming a result of an exclusive-OR using a predetermined substitution table;

program code for performing an expansion processing on a result of a nonlinear transform, wherein the program code for performing the expansion processing comprises program code for shifting a result of a nonlinear transform by a predetermined number of bits that is half the number of bits of a result of a nonlinear transform, or by the number of bits obtained by adding an integer multiple of the number of bits of the result of the nonlinear transform to the half number of bits;

program code for calculating the expansion key based on a result of expansion processing and a second key obtained from the input key; and program code for shifting the input key to a least significant bit or a most significant bit and inputting the shifted key to the key transform device of a next stage.

* * * * *